United States Patent
Nikolaou

(10) Patent No.: US 11,258,835 B2
(45) Date of Patent: Feb. 22, 2022

(54) COMPUTER-IMPLEMENTED METHOD OF PERFORMING A REAL-TIME COLLABORATION SESSION, COLLABORATIVE PLATFORM FOR PERFORMING REAL-TIME COLLABORATION SESSIONS, AND COLLABORATIVE CHAT POST OBJECT

(71) Applicant: RingCentral, Inc., Belmont, CA (US)

(72) Inventor: Ioannis Nikolaou, Attika (GR)

(73) Assignee: RingCentral, Inc., Belmont, CA (US)

( * ) Notice: Subject to any disclaimer, the term of this patent is extended or adjusted under 35 U.S.C. 154(b) by 16 days.

(21) Appl. No.: 16/842,860

(22) Filed: Apr. 8, 2020

(65) Prior Publication Data
US 2020/0236151 A1 Jul. 23, 2020

Related U.S. Application Data

(63) Continuation of application No. 16/056,643, filed on Aug. 7, 2018, now Pat. No. 10,652,288.

(30) Foreign Application Priority Data

Sep. 1, 2017 (EP) .................................. 17189026

(51) Int. Cl.
*H04L 29/06* (2006.01)
*G06Q 10/10* (2012.01)
(Continued)

(52) U.S. Cl.
CPC ......... *H04L 65/4015* (2013.01); *G06Q 10/10* (2013.01); *H04L 65/4053* (2013.01)

(58) Field of Classification Search
CPC ....... H04L 51/05; H04L 51/046; H04L 51/16; H04L 51/02; H04L 51/32; H04L 51/18;
(Continued)

(56) References Cited

U.S. PATENT DOCUMENTS 5,040,142 A 8/1991 Mori et al.
5,315,504 A 5/1994 Lemble
(Continued)

FOREIGN PATENT DOCUMENTS

CN 102982401 A 3/2013
CN 104504079 A 4/2015
(Continued)

OTHER PUBLICATIONS

First Office Action, dated Oct. 12, 2020, issued in Chinese Patent Application No. 201811009814.6 (26 total pages).
(Continued)

*Primary Examiner* — Michael A Keller
*Assistant Examiner* — Thao D Duong
(74) *Attorney, Agent, or Firm* — Finnegan, Henderson, Farabow, Garrett & Dunner LLP

(57) ABSTRACT

A telecommunication device, apparatus, and a computer-implemented method of performing a real-time collaboration session with a plurality of participants can be configured so that a method can be performed. The method can include starting a chat application (e.g. a group chat application) for the participants of the real-time collaboration session; automatically creating, upon a first event being external or internal to the chat application, creating a collaborative chat post object (CCPO), for the session, authorizing the participants to edit the chat conversation content of the CCPO; and automatically sealing permanently the CCPO upon a second event being external or internal event to the chat application. For sealing the CCPO, the editable content of the CCPO can be converted into read-only content.

15 Claims, 2 Drawing Sheets

(51) Int. Cl.
*H04L 65/401* (2022.01)
*H04L 65/4053* (2022.01)

(58) Field of Classification Search
CPC ... H04L 65/403; H04L 51/10; H04L 12/1813; G06F 40/30; G06F 3/0482; G06F 8/38; G06F 16/9535; G06F 40/18
See application file for complete search history.

(56) References Cited

U.S. PATENT DOCUMENTS

| | | | |
|---|---|---|---|
| 8,202,166 B2 | 6/2012 | Green | |
| 9,218,102 B1 | 12/2015 | Greenspan et al. | |
| 2003/0060910 A1 | 3/2003 | Williams et al. | |
| 2009/0144157 A1* | 6/2009 | Saracino | G06Q 30/02 705/14.73 |
| 2012/0005596 A1* | 1/2012 | Carlson | G06F 9/445 715/751 |
| 2012/0130954 A1* | 5/2012 | Hood | G06Q 10/10 707/640 |
| 2012/0185759 A1* | 7/2012 | Balinsky | G06Q 10/103 715/209 |
| 2013/0091205 A1 | 4/2013 | Kotler et al. | |
| 2013/0254699 A1* | 9/2013 | Bashir | G06Q 10/10 715/772 |
| 2013/0262574 A1* | 10/2013 | Cohen | H04L 51/18 709/204 |
| 2014/0032655 A1* | 1/2014 | Pegg | H04L 65/4015 709/204 |
| 2014/0219433 A1* | 8/2014 | Pai | H04M 3/565 379/202.01 |
| 2016/0048486 A1* | 2/2016 | Lopategui | G06F 40/197 715/229 |
| 2017/0076046 A1* | 3/2017 | Barnes | G06Q 10/06 |
| 2017/0083871 A1 | 3/2017 | Chang et al. | |
| 2018/0336520 A1 | 11/2018 | Davis et al. | |

FOREIGN PATENT DOCUMENTS

| | | |
|---|---|---|
| WO | 2014080393 A1 | 5/2014 |
| WO | 2015025308 A1 | 2/2015 |

OTHER PUBLICATIONS

European search Report for European Patent Application No. 17189026.2 dated Oct. 27, 2017.

* cited by examiner

COMPUTER-IMPLEMENTED METHOD OF PERFORMING A REAL-TIME COLLABORATION SESSION, COLLABORATIVE PLATFORM FOR PERFORMING REAL-TIME COLLABORATION SESSIONS, AND COLLABORATIVE CHAT POST OBJECT

CROSS REFERENCE TO RELATED APPLICATIONS

The present application is a continuation application of U.S. patent application Ser. No. 16/056,643, which claims priority to European Patent Application No. EP 17189026.2, filed on Sep. 1, 2017. The entirety of this application is incorporated by reference herein.

FIELD

The present invention relates to a telecommunications system, a telecommunications device, a computer-implemented method of performing a real-m time collaboration session, a collaborative platform for performing real-time collaboration sessions, and a collaborative chat post object that can be utilizable in telecommunication systems.

BACKGROUND

Collaborative platforms are known which are used for, for example, performing telephone conferences via the Internet with a group of participants which are located at different places. Such collaborative platforms can provide a group chat environment for the participants of a conference call or the like being able to communicate and collaborate on a common task.

Usually, a conference call is initiated by a person who also will be a participant of the following conversation or discussion and who selects a number of participants to join the conference call for discussing a specific issue. At the end of the conference call which duration may, for example, be preset, an agreement of the participants on a specific topic or issue discussed in the conference call should be reached.

SUMMARY

I have determined that once agreement has been reached during a conference call, it would be desirable to obtain a written record on the outcome of the conference call so that none of the participants can claim it was finalized without him/her being aware of the content and or the rules followed for the finalization of the content. However, in collaboration platform environments known from the prior art, this is problematic since normal chat messages or posts in chats cannot be used as record of an agreement for a couple of reasons. First of all, they actually do belong to a single user or participant of the collaboration session. Secondly, chats or posts are only modifiable by the originator in the chat or the creator of the post. Thirdly, they can be potentially modified or even deleted after an agreement has been reached, and, therefore are not tamper-proof. Some embodiments of the present invention is based on the object to provide tamper-proof records of real-time collaboration sessions.

Accordingly, a computer-implemented method of performing a real-time collaboration session with a plurality of participants is wherein the method can include at least the following steps: starting a chat application (e.g., a group chat application), for the participants of the real-time collaboration session; automatically creating, upon a first event being external or internal to the chat application, a collaborative chat post object ("CCPO"), for the real-time collaboration session where the CCPO comprises information descriptive of the participants of the real-time collaboration session and chat conversation content generated by the participants; authorizing the participants of the real-time collaboration session to modify the content of the CCPO; automatically sealing the CCPO upon a second event being external or internal event to the chat application wherein, for sealing the CCPO, the editable content of the CCPO is converted to read-only content. The first event may be, for example, the starting of a conference call via the Internet which trigger the automatic creation of the CCPO (external event) or the explicit creation of a CCPO by one of the participants (internal event).

By embodiments of the inventive method, a smart and business-oriented document control is enabled in the context of real-time collaboration sessions, as conference calls or the like. The minutes or any other important notes or agreements made during the collaboration session are gathered synchronously during the session and/or asynchronously after the session, then the document comprising the information gathered is sealed and tamper-proof so that it will not be possible to modify its content. The CCPO employed in the inventive method supports multiple workflows, as mentioned above, meeting minutes or voting. For example, in the case of a voting procedure, once an agreement has been reached, a record of this agreement is created which can be provided to all participants and which is tamper proof so that no modifications by any of the participants are possible. Thus, the record or a document containing the record is sealed.

According to a preferred embodiment, the method further comprises a step of creating a document comprising the chat conversation content and being editable during the real-time collaboration session by the participants. Thereby, during the session, all participants are able to contribute to a discussion and provide input which is gathered in the document. Such contribution can be facilitated by use of input and output devices connected to a computer device of each participant. For instance, a participant can utilize a display of his or her computer device (e.g. smart phone, laptop providing video call conferencing functionality, etc.) and provide content for a chat session via manipulation of a touch screen feature of the display or a keyboard connected to the computer device. The shared document can be managed by a server device that is connected to the computer devices of the participants to receive communications from the computer devices for updating the shared document while also communicating the shred document to those devices so that the text or other information of the document is displayable via display devices of the devices.

According to another preferred embodiment, during the real-time collaboration session, the document is shared among the participants, wherein all modifications made to the document by editing its content is visible to all participants. Therefore, during the session, all participants are always able to follow the course of discussion and contribute to it, if desired, accordingly so that an efficient collaboration on a specific task is enabled. For instance, the shared document can be managed by a server device that is connected to the computer devices of the participants to receive communications from the computer devices for updating the shared document while also communicating the shred document to those devices so that the text or other information of the document is displayable via display devices of the devices. As another example, the shared document can be managed by one of the participant's devices and that device can communicate with the other participants' devices to receive information for updating or editing of the shared document (e.g. adding new content to a chat session, etc.) while also providing information about the shared document so that the other participants' devices can display the content of the document via a displays of the participants' devices.

The document may comprise the minutes of the real-time collaboration session, and/or notes, and/or agreements of the participants. Such content can be obtained via in different ways. For instance, such content can be obtained via input received by participants during the real-time collaboration session. For example, such content can be obtained via participants manually typing content for a chat session or from a microphone recording speaking of the participants and transcribing that recorded audio into text. A central conference server may perform the transcribing or each participants' device may perform the transcribing prior to providing the data to the device managing the shared document.

Further, the real-time collaboration session may be an Internet-based conference call, a conference call using dial-in capabilities of a conference bridge, a group chat session where the participants are communicating using text messages. The real-time collaboration session may also be other types of real-time communication sessions (e.g. video conference call, telephone conference call that occurs in combination with a group chat session, etc.).

After the second event, the document can be sealed so that it is read-only such that the content of the document cannot be modified by the participants after the second event. The second event may be, for example, the reach of majority consensus, the reach of unanimity, the elapsing of a predetermined time period counted by a timer or the reach of a due date. Basically, however, the second event depends on the type the CCPO.

Moreover, according to still another preferred embodiment, the step of automatically sealing the CCPO can be carried out according to a type of the CCPO selected at the time of creating the CCPO, wherein the type of the CCPO determines the condition after which no more modifications to its content, in particular, to the document are accepted, and wherein:
a first type of CCPO comprises the majority of the participants having to accept a last modification of the document,
a second type of CCPO comprises all participants having to accept the last modification of the document,
a third type of CCPO comprises a predetermined time period having to elapse after the last modification of the document, and
a fourth type of CCPO comprises a predetermined date having to be reached.

As mentioned above, the type of the CCPO will trigger the second event accordingly. For example, if all participants have reached an agreement according to the second type of CCPO, then the second event will be, for example, counting all votes of the participants of the collaboration session as being positive or "yes".

According to another preferred embodiment, the participants of the collaborative session, including the initiator, are not authorized to delete the CCPO. Therefore, the record of a collaboration session is not only tamper-proof but also is unerasable.

A participant of the real-time collaboration session may create the CCPO explicitly or the CCPO may be created automatically when for example a conference call is initiated (implicit creation).

Further, the type modification mode must be specified in the step of creating the CCPO, and the type modification mode is not modifiable after having been selected. This enhances the undeniability of the content of the tamper-proof record of a collaboration session.

According to still a further embodiment, a type modification mode is specified at the time of creating the CCPO, the type modification mode being any one of a first type modification mode not allowing the type of the CCPO to be changed after it has been created, a second type modification mode allowing the type of the CCPO be changed if a majority of the participants or owners of the CCPO have agreed to changing the type of the CCPO, and a third type modification mode allowing the type of the CCPO to be changed only if all of the participants or owners have agreed to changing the type of the CCPO.

According to the invention, a collaborative platform for performing real-time collaboration sessions is provided, the platform being adapted to carry out the method of performing a real-time collaboration session with a plurality of participants.

Further, according to the invention, a collaborative chat post object (CCPO) is provided being created for the real-time collaboration session according to the method of performing a real-time collaboration session with a plurality of participants.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

BRIEF DESCRIPTION OF THE DRAWINGS

Exemplary embodiments of a telecommunications device, apparatus, and system and methods of making and using the same are shown in the accompanying drawings. The drawings include FIG. 1, which illustrates an exemplary process by which a tamper-proof object can be generated via an exemplary telecommunication apparatus. The drawings also include FIG. 2, which is a schematic view of an exemplary telecommunications apparatus.

A key of reference indicia included in FIG. 1

DETAILED DESCRIPTION OF EXEMPLARY EMBODIMENTS

Figure 1:
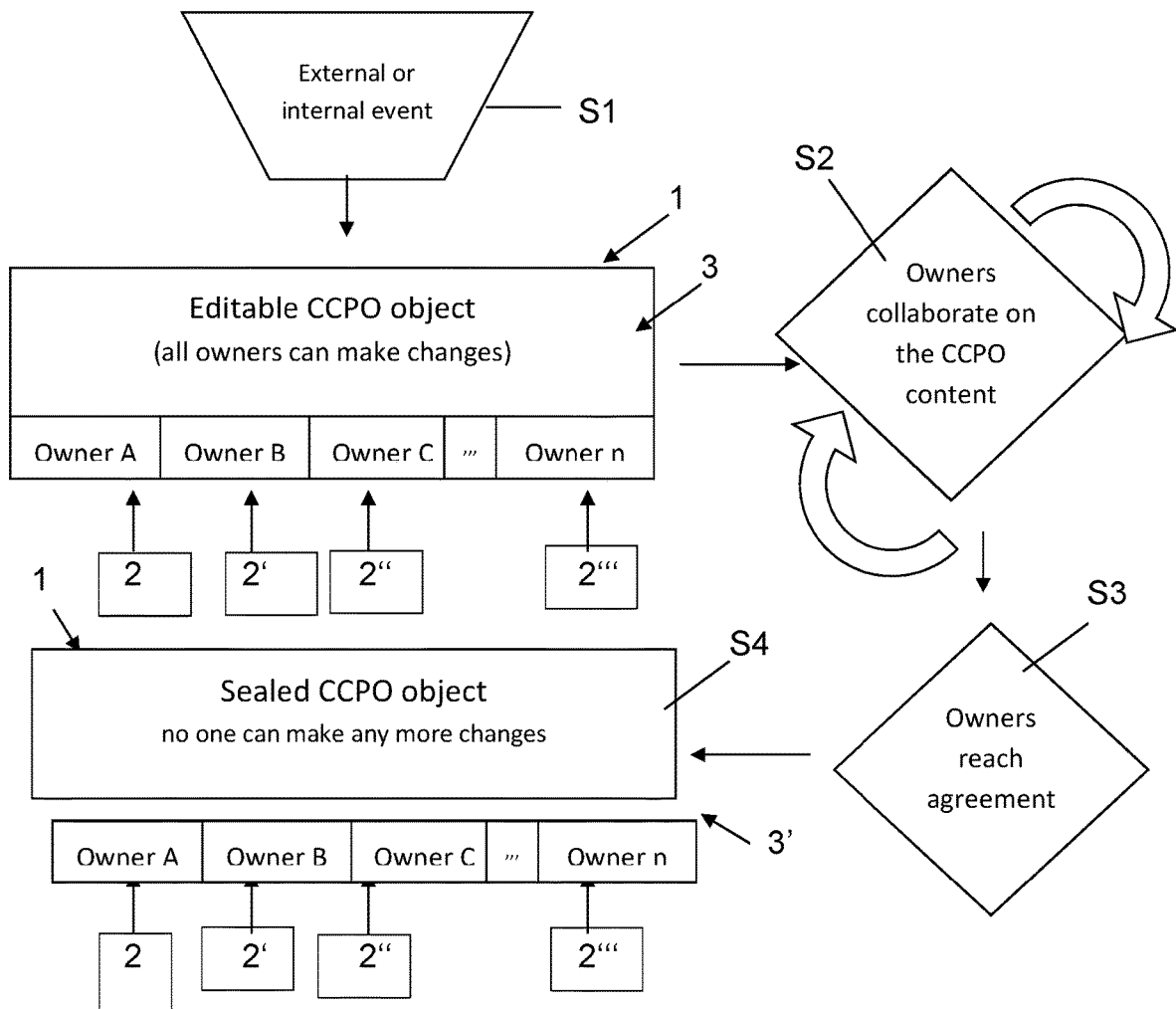
FIG. 2 1 is provided below:
1—CCPO
2, 2', 2", 2'''—participants to a conference call (participating via participant devices that each include a processor connected to non-transitory memory, at least one receiver, and at least one transmitter)
3, 3'—document
A, B, C, n—owners
S1, S2, S3, S4—steps

FIG. 1 illustrates a sequence according to which a sealed tamper-proof CCPO 1 is created according to an embodiment of the computer-implemented method of performing a real-time collaboration session with a plurality of participants 2, 2', 2" . . . 2'''. The symbol ", , ," in FIG. 1 indicates that any number of participants can be additionally included. Each participant can participate in a telecommunications real-time collaboration session with a communication device that includes hardware. Examples of such communication devices include laptop computers, smart phones, desktop phones, tablets, desktop computers, and other types of communication terminal devices. Each participant device can include a processor connected to non-transitory memory, at least one receiver, and at least one transmitter. A receiver and a transmitter can be present as a transceiver in some embodiments. (e.g. a cellular connection transceiver, a wireless local area network transceiver, a near field communication transceiver, a Bluetooth transceiver, etc.). Each participant device can also include one or more input devices, output devices and/or input/output devices (e.g. a keypad, a keyboard, a display, a touch screen display, a pointer, a stylus, a microphone, a camera, etc.).

As can be seen here, after a chat application which may be a group application has been started so that a plurality of participants are able to perform a real-time collaboration session via their communication devices. The chat application can be run or hosted by a platform in some embodiments, as can be appreciated from FIG. 2. The platform can include one or more server computer devices that are communicatively connectable to participant devices (e.g. via a network connection, an internet connection, a large area network connection, a combination of network connections, etc.). Each server computer device (referred to in FIG. 2 as "server") can include a processor connected to non-transitory memory as well as other hardware (e.g. at least one receiver, at least one transmitter, etc.).

Figure 2:
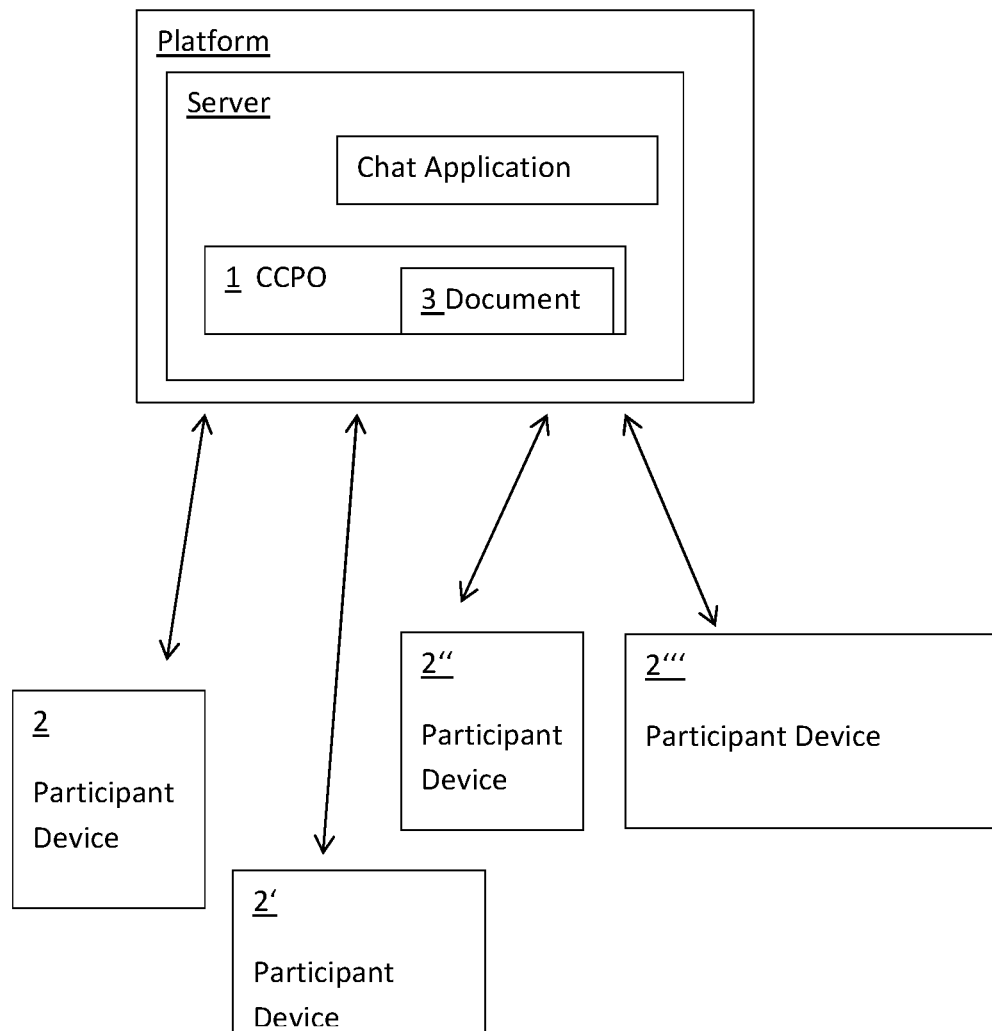

FIG. 2 illustrates the platform as includes a single server. But, it should be appreciated that the platform can include multiple servers. For instance, a platform can include a first server for hosting a chat application and a second server for generation and management of a CCPO that is communicatively connectable to the first server so that the first and second server can collaboratively operate in conjunction with a real-time collaboration session to provide services to the participants via the participant's communication devices to which the servers are communicatively connected.

As can be seen in the exemplary method shown in FIG. 1, in a first step S1, a first event which may be either external to the chat application started or internal, triggers the automatic ad hoc creation of a CCPO 1 for that real-time collaboration session. The first event may be, for example, the initiation of a conference call. The conference call may be hosted by a participant device or a conference call management device (e.g. a conference call server having a processor connected to non-transitory memory as well as other hardware and/or a group chat supporting server that hosts the group chat session component of the conference call (the group chat supporting server having hardware that includes at least one processor connected to non-transitory memory and is configured for communicatively connecting to the participant devices), etc.).

At creation time, the CCPO 1 is assigned a type and a type modification mode. The type of the CCPO 1 determines when the CCPO 1 does not accept any more modifications and will be sealed. Basically, there are four types of the CCPO 1:

A first type, named a "majority type", requires that the CCPO 1 will be sealed as soon as the majority of the owners A, B, C . . . n or participants 2, 2', 2" . . . 2''' have accepted the last content modification. A second type, named an "unanimous type", requires that the CCPO 1 will be sealed as soon as all the owners A, B, C . . . n or participants 2, 2', 2" . . . 2''' have accepted the last content modification. A third type, named an "implicit type I" requires sealing after a specific amount of time has passed after the last content modification, and a fourth type, named "implicit type II" requires sealing after a specific date has been reached.

The type of CCPO 1 may be changed during the collaboration session as outlined further below. With respect to the first and second CCPO types, if an owner A, B, C . . . n or participant 2, 2', 2" . . . 2''' modifies the CCPO 1 after one or more of the other owners A, B, C . . . n or participants 2, 2', 2" . . . 2''' have already casted a vote, the already casted votes are cancelled and the voting process starts again. With respect to the third type, if an owner A, B, C . . . n or participant 2, 2', 2" . . . 2''' modifies the CCPO 1, a timer that counts towards the implicit acceptance time is reset. With respect to the fourth type, any of the owners A, B, C . . . n or participants 2, 2', 2" . . . 2''' may modify the CCPO 1 before the specified date.

Further, there are several CCPO type modification modes according to which the type of the CCPO 1 may or may not be changed. Namely, the type of the CCPO 1 may or may not be changed after the CCPO 1 has been created depending on the type modification mode that has been explicitly specified at creation time. Possible type modification modes are a first type modification mode, also named "locked type modification mode" which, when selected, does not allow for the type of the CCPO 1 ever being changed after having been created, a second type modification mode, also named "majority type modification mode" which allows for the type of the CCPO 1 being changed if a majority of owners A, B, C . . . n or participants 2, 2', 2" . . . 2''' agree to the change, and a third type modification mode, also named "unanimous type modification mode" allowing for the type of the CCPO 1 being changed if all owners A, B, C . . . n or participants 2, 2', 2" . . . 2''' agree to the change.

The CCPO 1 generated thereupon comprises information on all participants 2, 2', 2" . . . 2''' which, as already mentioned above, are so-called "owners" A, B, C . . . n of the CCPO 1 and which are allowed to modify the CCPO 1 which at this stage is editable or comprises an editable document 3. In a further step S2, the owners or participants 2, 2', 2" . . . 2''' collaborate on the content of CCPO 1, i.e., notes may be made, questions may be posed and answered, suggestions may be written into the editable document 3, etc. Since the content of the CCPO 1 or the editable document 3 is visible to all participants 2, 2', 2" . . . 2''', they all are able to follow the collaboration session in real-time or asynchronously and contribute to it accordingly.

After, in a further step S3, a task to be solved in the collaboration session is eventually solved by the participants 2, 2', 2" . . . 2''', or after an agreement has been reached on a specific topic of the collaboration session, corresponding to either the first type of the CCPO according to which the majority of the participants 2, 2', 2" . . . 2''' have to accept the last modification of the document 3, or to the second type of the CCPO according to which all participants 2, 2', 2" . . . 2''' have to accept the last modification of the document 3, the CCPO 1 will be automatically sealed in a further step S4.

A sealing mechanism will then convert the editable content or editable document 3 into read-only content or a read-only document 3'. The read-only content or document 3' is provided to all owners A, B, C, . . . , n or participants 2, 2', 2" . . . 2''' of the CCPO 1, respectively, who, however, are not able to modify the content after the sealing. Thereby, a tamper-proof record of the collaboration session, comprising for example, the minutes or the result of the collaboration session, can be provided to all participants 2, 2', 2" . . . 2'''. The sealing mechanism can be run by the device that hosts or manages the CCPO for the collaboration session (e.g. a participant device that may run or manage the CCPO, a central server device that may facilitate or run the collaboration session, a server device that may manage the sharing of a document during the collaboration session, etc.).

Further features of the CCPO are outlined below. The CCPO may be co-owned by a whole group of participants 2, 2', 2" . . . 2''' of a collaboration session or only by a subgroup of that group, for example, comprising only the participants 2 and 2'. In some embodiments, the co-owning can be an assignment identifier defined in the CCPO by a device that generates the CCPO during a collaboration session.

In some embodiments, the owners A, B, C . . . n or participants 2, 2', 2" . . . 2''' of the CCPO 1 cannot be modified after the CCPO 1 has been created. In other embodiments, the CCPO 1 may not be modifiable after the CCPO is sealed (e.g. made so that its content is read only and unchangeable after sealing).

If the CCPO 1 was explicitly created by one of the group members (namely, either one of owners A, B, C . . . n or participants 2, 2', 2" . . . 2'''), the creator of the CCPO 1 may not have any additional permissions or privileges with respect to the CCPO 1 compared to the other owners A, B, C . . . n or participants 2, 2', 2" . . . 2''' based on the generation of the CCPO 1 and the assignment of permissions defined in the generated CCPO 1.

In some embodiments, the owners A, B, C . . . n or participants 2, 2', 2" . . . 2''' of the CCPO 1 may initially modify its content. Any content modification changes to the CCPO 1 are visible to all owners A, B, C . . . n or participants 2, 2', 2" . . . 2''' of the CCPO 1. Any comments or other modifications to the CCPO 1 may also be made by other owners or participants in response to viewing the modification of the CCPO 1 made by another person. It should be understood that content modification changes can be made via the owners or participants using their respective communication devices as discussed herein.

The CCPO 1 will become read-only after a second internal or external event depending on the type of the CCPO 1, as outlined above. Once the CCPO 1 is read-only neither its content nor its type can be modified by any of the owners A, B, C . . . n or participants 2, 2', 2" . . . 2'''.

In some embodiments, the CCPO 1 can be created and defined such that the owners A, B, C . . . n or participants 2, 2', 2" . . . 2''' of the CCPO 1 cannot delete the CCPO 1 itself. Also, the creating and defining of the CCPO 1 can be performed such that the owners A, B, C . . . , n or participants 2, 2', 2" . . . 2''' of the CCPO 1 cannot modify the CCPO type modification mode specified at creation time.

In the following, two exemplary examples for creating a CCPO 1 are given.

Example 1

The first example refers to a CCPO 1 being created by an external event, the initiation of a conference call, and comprising the minutes of a meeting (MoM) object that is storable in non-transitory memory of at least one communication device (e.g. a server, a participant communication device, etc.). When a conference call, for example, a conference call via the Internet using a corresponding application run on participant devices and supported by a central server device, is started, a conference object is created that includes the 2, 2', 2" . . . 2''' of the conversation that participate in the conference call. A CCPO 1 is automatically created by the application (e.g., Circuit) according to third type with a time limit of two days (i.e., implicit sealing after a specific amount of time) and with a first type modification mode (e.g. "locked type modification mode"). The CCPO 1 allows only the conference participants 2, 2', 2" . . . 2''' to capture the minutes of the meeting of the conference and collaboratively edit them. Because of the CCPO 1 configuration, the minutes of the meeting will be automatically sealed two days after the last modification. Each time one of the owners A, B, C . . . n' or participants 2, 2', 2" . . . 2''' make a modification the elapsed time is reset and the count toward the two days starts over. In response to modification of the CCPO 1 that may occur, a communication to communication devices of other participants can be transmitted to make the other participants aware of the changed content to facilitate their review so that any further changes that they may deem needed due to the modification of the CCPO 1 can be made. After each such modification, a communication to all participants or the other non-modifying participants can be sent to facilitate a review and comment on each change to help ensure transparency and help ensure group agreement on the changes.

The CCPO object owners A, B, C . . . n' will be the participants 2, 2', 2" . . . 2''' of the specific conference. For any other conference in the same conversation (e.g., Circuit conversation), there will be a different CCPO 1. Each CCPO 1 may potentially have different owners A, B, C . . . n depending on who participated in each conference.

Example 2

The second example refers to the CCPO 1 being created by an internal event. In a conversation, for example, a Circuit conversation, one of the participants 2, 2', 2" . . . 2''' explicitly creates a CCPO 1 and adds some or all of the conversation participants as owners of the CCPO. The creator sets the type to the fourth type, namely, implicit sealing after reaching a certain date, the target date being Dec. 14, 2016. Further, the type modification mode is selected to be the second type modification mode (e.g. "majority type modification mode").

The creator asks the owners A, B, C . . . n or participants 2, 2', 2" . . . 2''' to jointly create a set of requirements for a problem they want to tackle. Any of the owners A, B, C . . . , n or participants 2, 2', 2" . . . 2''' added to the CCPO 1 at creation time can contribute and edit the content. The CCPO 1 will be automatically sealed on the target date of Dec. 14, 2016.

Before the due date, the majority of the owners A, B, C . . . , n or participants 2, 2', 2" . . . 2''' agree that they want to change the type of the CCPO 1 to the second type ("unanimous type"). The CCPO 1 will now modified by the change in definition of the CCPO type so that the CCOP 1 can be sealed only after all the owners A, B, C . . . , n or participants 2, 2', 2" . . . 2''' have explicitly agreed on the content and the target date of Dec. 14, 2016 is no longer relevant. The changing of the CCPO type can be facilitated via the participants utilizing their communication devices to provide data to the device managing the CCPO to effect changes to the permissions or other features of the initially defined and created CCPO.

It should be appreciated that different embodiments of a telecommunication device, apparatus, and/or system can utilize different arrangements to meet a particular set of design criteria. For instance, it should be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Therefore, while certain exemplary embodiments of a telecommunications device, apparatus, and system, and methods of making and using the same have been shown and described above, it is to be distinctly understood that the invention is not limited thereto but may be otherwise variously embodied and practiced within the scope of the following claims.

What is claimed is:

1. A computer-implemented method of sealing chat objects of a collaboration system, comprising:
    creating a chat object from a real-time collaboration session, wherein the chat object comprises a chat object type indicating a condition for sealing of the chat object;
    initiating a first voting process to seal the chat object;
    generating an edited chat object in response to receiving an edit to the chat object;
    initiating a second voting process to seal the edited chat object; and
    sealing the edited chat object based on the chat object type and in response to receiving a vote from the second voting process,
    wherein the chat object type indicates that the chat object is sealed when the vote is decided after a predetermined time period or upon reaching a predetermined date.

2. The computer-implemented method of claim 1, wherein sealing the edited chat object comprises converting the edited chat object to a read-only format.

3. The computer-implemented method of claim 1, wherein the real-time collaboration session comprises an Internet-based call.

4. The computer-implemented method of claim 1, wherein the real-time collaboration session comprises an audio call or a video call.

5. The computer-implemented method of claim 1, wherein the chat object type indicates that the chat object is sealed when the vote is a majority vote or a unanimous vote.

6. The computer-implemented method of claim 1, wherein creating the chat object further comprises creating a type modification mode, and wherein the method further comprises:
    changing the chat object type based on the type modification mode.

7. A system for sealing chat objects of a collaboration system, the system comprising:
    a processor;
    a non-transitory memory operatively connected to the processor and storing instructions that, when executed by the processor, cause:
    creating a chat object from a real-time collaboration session, wherein the chat object comprises a chat object type indicating a condition for sealing of the chat object;
    initiating a first voting process to seal the chat object;
    generating an edited chat object in response to receiving an edit to the chat object;
    initiating a second voting process to seal the edited chat object; and
    sealing the edited chat object based on the chat object type and in response to receiving a vote from the second voting process,
    wherein the chat object type indicates that the chat object is sealed when the vote is decided after a predetermined time period or upon reaching a predetermined date.

8. The system of claim 7, wherein sealing the edited chat object comprises converting the edited chat object to a read-only format.

9. The system of claim 7, wherein the real-time collaboration session comprises an Internet-based call.

10. The system of claim 7, wherein the real-time collaboration session comprises an audio call or a video call.

11. The system of claim 7, wherein the chat object type indicates that the chat object is sealed when the vote is a majority vote or a unanimous vote.

12. The system of claim 7, wherein creating the chat object further comprises creating a type modification mode, and wherein the memory stores additional instructions that, when executed by the processor, cause:
    changing the chat object type based on the type modification mode.

13. A non-transitory, computer-readable medium storing a set of instructions that, when executed by a processor, cause:
    creating a chat object from a real-time collaboration session, wherein the chat object comprises a chat object type indicating a condition for subsequent sealing of the chat object;
    initiating a first voting process to seal the chat object;
    generating an edited chat object in response to receiving an edit to the chat object;
    initiating a second voting process to seal the edited chat object; and
    sealing the edited chat object based on the chat object type and in response to receiving a vote from the second voting process,
    wherein the chat object type indicates that the chat object is sealed when the vote is decided after a predetermined time period or upon reaching a predetermined date.

14. The non-transitory, computer-readable medium of claim 13, wherein sealing the edited chat object comprises converting the edited chat object to a read-only format.

15. The non-transitory, computer-readable medium of claim 13, wherein the real-time collaboration session comprises an audio call or a video call.

* * * * *